(12) United States Patent
Sun et al.

(10) Patent No.: US 10,934,944 B2
(45) Date of Patent: Mar. 2, 2021

(54) METHOD FOR OPTIMIZATION OF TRANSIENT CONTROL LAW OF AERO-ENGINE

(71) Applicant: DALIAN UNIVERSITY OF TECHNOLOGY, Liaoning (CN)

(72) Inventors: Ximing Sun, Liaoning (CN); Xian Du, Liaoning (CN); Yanhua Ma, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/763,018

(22) PCT Filed: Nov. 7, 2018

(86) PCT No.: PCT/CN2018/114327
§ 371 (c)(1),
(2) Date: May 11, 2020

(87) PCT Pub. No.: WO2020/093264
PCT Pub. Date: May 14, 2020

(65) Prior Publication Data
US 2020/0362770 A1    Nov. 19, 2020

(51) Int. Cl.
*F02C 9/44*       (2006.01)
*B64D 31/06*      (2006.01)

(52) U.S. Cl.
CPC ............... *F02C 9/44* (2013.01); *B64D 31/06* (2013.01)

(58) Field of Classification Search
CPC .. F02C 9/44; F02C 9/26; B64D 31/06; G01M 15/00
See application file for complete search history.

(56) References Cited

U.S. PATENT DOCUMENTS 8,016,243 B2*  9/2011  Beaufrere .............. B64D 31/00
                                                244/194
9,002,615 B2*  4/2015  Kumar ...................... F02C 9/28
                                                701/100
(Continued)

FOREIGN PATENT DOCUMENTS

CN    102289203 A    12/2011
CN    105715384 A     6/2016
(Continued)

*Primary Examiner* — Mussa A Shaawat
(74) *Attorney, Agent, or Firm* — Muncy, Geissler, Olds & Lowe, P.C.

(57) ABSTRACT

A design method for optimization of a transient control law of the aero-engine is disclosed, and performs the transient schedule optimization for the aero-engine by adopting an SQP algorithm, to realize the design of the transient control law along a constrained boundary condition. The fuel flow rate value is adjusted, other constraints remain unchanged, and the transient control law is designed under different limits. The transient time under each transient control law is calculated by constructing the transient time evaluation function. A lookuptable interpolation table is established by using the calculated transient time and corresponding fuel flow, to realize the fuel flow scheduling under different transient time. The fuel flow obtained by scheduling in the expected time is taken as an acceleration and deceleration control schedule of the closed-loop control of the aero-engine, and the output thereof is taken as the reference instruction of an acceleration process.

1 Claim, 5 Drawing Sheets

(56) References Cited

U.S. PATENT DOCUMENTS

| | | | |
|---|---|---|---|
| 9,296,474 B1* | 3/2016 | Nguyen | G05B 13/048 |
| 9,878,692 B2* | 1/2018 | Cai | B60T 7/12 |
| 2008/0177456 A1 | 7/2008 | Hill et al. | |
| 2009/0143871 A1* | 6/2009 | Gao | G05B 13/04 |
| | | | 700/29 |
| 2010/0064657 A1* | 3/2010 | Mahoney | F02C 9/30 |
| | | | 60/39.281 |
| 2013/0138274 A1* | 5/2013 | Caldeira | G05D 1/0676 |
| | | | 701/16 |
| 2014/0058644 A1* | 2/2014 | Adibhatla | B64D 31/06 |
| | | | 701/100 |
| 2014/0297155 A1* | 10/2014 | Chen | F02C 9/26 |
| | | | 701/100 |
| 2015/0225088 A1* | 8/2015 | Andrejczyk | B64D 43/00 |
| | | | 701/3 |
| 2015/0345403 A1* | 12/2015 | Cai | F01D 17/00 |
| | | | 701/100 |
| 2015/0370266 A1* | 12/2015 | Norris | B64C 27/001 |
| | | | 700/280 |
| 2015/0378327 A1* | 12/2015 | Li | F02C 9/28 |
| | | | 700/45 |
| 2016/0214731 A1* | 7/2016 | Schmidt | B64D 31/06 |
| 2016/0236790 A1* | 8/2016 | Knapp | B64C 11/44 |
| 2016/0311546 A1* | 10/2016 | Adibhatla | B64D 31/06 |
| 2018/0119628 A1* | 5/2018 | Zeller | F02D 41/1402 |
| 2018/0119629 A1* | 5/2018 | Cline | G05B 13/042 |
| 2018/0244369 A1* | 8/2018 | Alfred | G05D 1/085 |
| 2018/0286253 A1* | 10/2018 | Darnell | G08G 5/0021 |
| 2018/0298830 A1* | 10/2018 | Moroto | F02C 9/28 |
| 2019/0155282 A1* | 5/2019 | Kim | B64C 13/503 |
| 2019/0322380 A1* | 10/2019 | Roberts | G05D 1/0607 |
| 2020/0081405 A1* | 3/2020 | Skertic | G05B 7/02 |

FOREIGN PATENT DOCUMENTS

| | | |
|---|---|---|
| CN | 106323640 A | 1/2017 |
| CN | 108375474 A | 8/2018 |
| CN | 108762089 A | 11/2018 |

* cited by examiner

METHOD FOR OPTIMIZATION OF TRANSIENT CONTROL LAW OF AERO-ENGINE

TECHNICAL FIELD

The present invention relates to a design method for optimization of a transient control law of an aero-engine, and belongs to the technical field of transient schedule optimization and control of the aero-engine.

BACKGROUND

The present invention is based on the optimization of a transient control law of a nonlinear component-level mathematical model of a certain type of high bypass ratio turbofan engine. Generally speaking, the aero-engine control mainly comprises the steady-state control and the transient-state control. The steady-state control is to ensure that the performance of an aero-engine will not be fluctuated when the aero-engine is disturbed at a certain steady state operating point so that the aero-engine can be returned to a steady state, which is a small perturbation control problem. In the transient control of the aero-engine, the parts or all of the performance of the aero-engine changes with time. The acceleration and deceleration performance is commonly referred to be a main form of the transient-state performance of the aero-engine, and the acceleration and deceleration performance of the aero-engine directly affects the takeoff acceleration performance of an aircraft. In order to obtain good transient-state performance, an acceleration and deceleration control schedule of the aero-engine should be designed correctly, so that the aero-engine transient time from one working state to another can be ensured to be shortest as much as possible under the constraint conditions. For a military aircraft and a combat aircraft, the fast combat requirements can be ensured; and similarly, for a civil aircraft, for the sake of safe flight, it is also necessary to ensure the shortest transient time of the aero-engine. The design of the acceleration and deceleration control schedule in the process of the aero-engine transient state has an important influence on the transient-state performance, therefore, it is necessary to research the transient control law of the aero-engine.

In the aero-engine transient state, the acceleration and deceleration control schedule is set according to the experience of translating up and down a steady state operating line and not exceeding some limit margin lines such as over-surge schedule and lean blow-out line, so that the design of acceleration and deceleration control schedule has a large margin to a certain extent, which makes the transient-state performance of the aero-engine not be fully played. According to an existing literature, the transient schedule optimization methods for the aero-engine include a power extraction method, but in the method, the volume effect of the aero-engine components can not be considered; in addition, there is also a fixed dynamic method, but for this method, many coupling factors are needed to be known in advance, so it is not convenient to design. The present invention adopts an SQP-based method to make the optimization design for the transient control law of the aero-engine, so that the aero-engine obtains the shortest transient time without exceeding the constraint boundary condition, thereby improving the transient-state performance of the aero-engine. At the same time, on the premise of not exceeding the boundary limit, the fuel flow rate limit value is adjusted to design the acceleration and deceleration control schedule under the non-shortest transient time. In the meantime, the acceleration and deceleration control schedule designed under different transient time can be used in the closed-loop control of the aero-engine transient state to provide a certain theoretical basis therefor, so as to achieve the full closed-loop control with different transient time as a target, and realize the combination of transient schedule optimization and closed-loop control.

SUMMARY

In order to ensure that an aero-engine transient state does not exceed the limit, and at the same time can meet the requirement for the aero-engine transient time, as well as to solve an open-loop control problem of the aero-engine in a process of acceleration and deceleration, the present invention provides a design method for optimization of a transient control law of an aero-engine.

The technical solution of the present invention is that:

the steps for a design method for optimization of a transient control law of an aero-engine are as follows:

S1. performing the transient schedule optimization for the aero-engine based on an SQP algorithm, to realize the design of the transient control law of the aero-engine running along the constrained boundary;

the steps for the design of the transient control law of the aero-engine running along the constrained boundary are as follows:

S1.1 determining the number of optimal nodes and the length of the entire optimization process time;

S1.2 taking the fuel flow obtained by the aero-engine under the action of a closed-loop controller as a reference, and selecting an initial value of the fuel flow, so that each output of the aero-engine does not exceed the limit value after the finally determined initial value of the fuel flow is loaded into an aero-engine model;

S1.3 setting the parameters of the number of calculations of the maximum function MaxFunEvals, the maximum number of iterations MaxIter and the accuracy of function TolFun related to optimization options of an SQP algorithm;

S1.4 determining boundary conditions for the optimization of the transient control law of the aero-engine, comprising high-pressure rotor speed $N_2$ limit, low-pressure rotor speed $N_1$ limit, compressor outlet total pressure $P_3$ limit, low-pressure turbine outlet temperature $T_5$ limit, surge margin of fan surge SMF, surge margin of compressor surge SMC, fuel flow $W_f$ limit and transient fuel flow rate $\Delta W_f$ limit, and establishing corresponding constraint function according to the constraint condition, wherein the form thereof is shown as follows:

$$N_{2,min} \leq N_2 \leq N_{2,max}$$

$$N_1 \leq N_{1,max}$$

$$P_3 \leq P_{3,max}$$

$$T_5 \leq T_{5,max}$$

$$SMF \geq SMF_{min}$$

$$SMC \geq SMC_{min}$$

$$W_{f,min} \leq W_f \leq W_{f,max}$$

$$\Delta W_f \leq \Delta W_{f,max}$$

where, $N_{2,min}$ is minimum high-pressure rotor speed, $N_{2,max}$ is maximum high-pressure rotor speed, $N_{1,max}$ is minimum low-pressure rotor speed, $P_{3,max}$ is maximum value of compressor outlet total pressure, $T_{5,max}$ is maximum value of low-pressure turbine outlet temperature, $SMC_{min}$ is minimum value of compressor surge margin, $SMF_{min}$ is minimum value of fan surge margin, $W_{f,min}$ and $W_{f,max}$ are respectively minimum value and maximum value, and $\Delta W_{f,max}$ is maximum value of fuel flow rate;

S1.5 according to the time requirement for the aero-engine transient state, establishing an objective function for optimization of the transient control law of the aero-engine, wherein the form thereof is shown as follows:

$$J=100*\text{norm}(N_2-N_{2,cmd}, 2)+100*\text{norm}(N_1-N_{1,cmd}, 2)$$

where, $N_{1,cmd}$ and $N_{2,cmd}$ are expected values of the low-pressure rotor speed and the high-pressure rotor speed;

S2. on the premise of not exceeding the limit boundary of the aero-engine, adjusting the limit value of the fuel flow rate of the aero-engine while other constraint conditions remain unchanged, thereby establishing the transient control law of the aero-engine under different fuel rate limits;

the steps for the design of the established transient control law of the aero-engine under different fuel rate limits are as follows:

S2.1 keeping the number of optimal nodes, the whole optimization process time, the initial value of the fuel flow and the setting of each optimization option consistent with the transient schedule optimization along the constrained boundary;

S2.2 keeping the high-pressure rotor speed $N_2$ limit, the low-pressure rotor speed $N_1$ limit, the compressor outlet total pressure $P_3$ limit, the low-pressure turbine outlet temperature $T_5$ limit, the surge margin of the fan surge SMF, the surge margin of the compressor surge SMC and the fuel flow $W_f$ limit in the aero-engine transient state unchanged, on the premise of not exceeding the maximum limit value $\Delta W_{f,max}$ of the transient fuel flow rate, changing the fuel flow rate limit, respectively set as $\Delta W_{f,1}, \Delta W_{f,2}, \Delta W_{f,3} \ldots \Delta W_{f,N}$, and performing the transient schedule optimization under different fuel flow rate limits again, to obtain the control law under different conditions, that is, fuel flow of $W_{f,1}, W_{f,2}, W_{f,3}, \ldots ; W_{f,N}$;

S2.3 saving the fuel flow of $W_{f,1}, W_{f,2}, W_{f,3} \ldots W_{f,N}$ of the aero-engine obtained through optimization under different fuel flow rate limits, to prepare for later fuel flow scheduling;

S3. after completing the design of the transient control law under different fuel rate limits, constructing the transient time evaluation function of the aero-engine, thereby determining the transient time under different transient control laws;

the steps for constructing the transient time evaluation function of the aero-engine are as follows:

S3.1 producing aero-engine model outputs: loading the fuel flow $W_f$ of the aero-engine into an aero-engine model, to obtain the aero-engine outputs: low-pressure rotor speed $N_1$, low-pressure rotor conversion speed $N_{1cor}$, high-pressure rotor speed $N_2$ and high-pressure rotor conversion speed of imported aero-engine $N_{2cor}$;

S3.2 taking high-pressure rotor speed $N_2$ in the aero-engine output as the evaluation variable of the aero-engine transient time, and when the speed fluctuates 0.2% above and below the steady state value, entering a steady state by default, wherein the entered time is the aero-engine transient time;

S3.3 loading the fuel flow of $W_{f,1}, W_{f,2}, W_{f,3} \ldots W_{f,N}$ in the transient control law of the aero-engine under different limits into the aero-engine model, to obtain the aero-engine model outputs of $N_{2,1}, N_{2,2}, N_{2,3} \ldots N_{2,N}$ under different limits, and calculating the transient time of $T_{s,1}, T_{s,2}, T_{s,3} \ldots T_{s,N}$ under different limits and saving;

S4. sorting the fuel flow under different transient control laws and the corresponding transient time from smallest to biggest, and establishing a lookuptable interpolation table; and according to the established interpolation table, implementing online transient-state control scheduling, that is, inputting the expected transient time of aero-engine, and then obtaining the corresponding fuel flow under the transient time by scheduling;

the steps for implementing the online transient-state control scheduling are as follows:

S4.1 sorting the fuel flow under limits and the corresponding transient time of $T_{s,1}, T_{s,2}, T_{s,3} \ldots T_{s,N}$ from smallest to biggest;

S4.2 taking each transient time of $T_{s,1}, T_{s,2}, T_{s,3} \ldots T_{s,N}$ as an interpolation node 1, taking the corresponding fuel flow of $W_{f,1}, W_{f,2}, W_{f,3} \ldots W_{f,N}$ as Tabledata, since the fuel flow loaded into the aero-engine model is in a time series format, taking the time series of the fuel flow as the interpolation node 2, and establishing a lookuptable interpolation table;

S4.3 selecting the expected transient time $T^*_s$, and interpolating through the established interpolation table, to obtain a group of fuel flow $W^*_f$ corresponding to the transient time, thereby implementing the online transient time scheduling;

S4.4 taking the fuel flow $W^*_f$ under the expected transient time as the aero-engine input, and saving the relevant aero-engine output, to take the saved output as reference instruction of the closed-loop controller;

S5. taking the fuel flow under the expected transient time as the aero-engine input to obtain the aero-engine output, and taking the relevant output parameters as the reference instruction of the closed-loop control of the aero-engine, to achieve the full closed-loop control of the aero-engine.

The beneficial effects of the present invention are that:

A design method for optimization of a transient control law of an aero-engine proposed in the present invention can design the transient control law that satisfies the transient time requirement through optimization under the condition that the aero-engine transient state does not exceed the limit, and compared with the previous transient state of the aero-engine running along the boundary, as long as the shortest transient time can be found, the present invention is more flexible in the selection of the aero-engine transient time, and the online transient-state control scheduling can be carried out according to the transient time; moreover, a transient schedule optimization method for the aero-engine has a certain universality and can be extended to other types of transient schedule optimization for a turbofan engine. At the same time, the control law designed through the transient schedule optimization can be used as the reference instruction in the full closed-loop control of the aero-engine, which solves the disadvantages of the previous transient open-loop control based on the acceleration and deceleration control schedule, provides a reliable theoretical basis for the closed-loop control of the aero-engine, and realizes the combination of the transient schedule optimization and the full closed-loop control.

DETAILED DESCRIPTION

Figure 1:
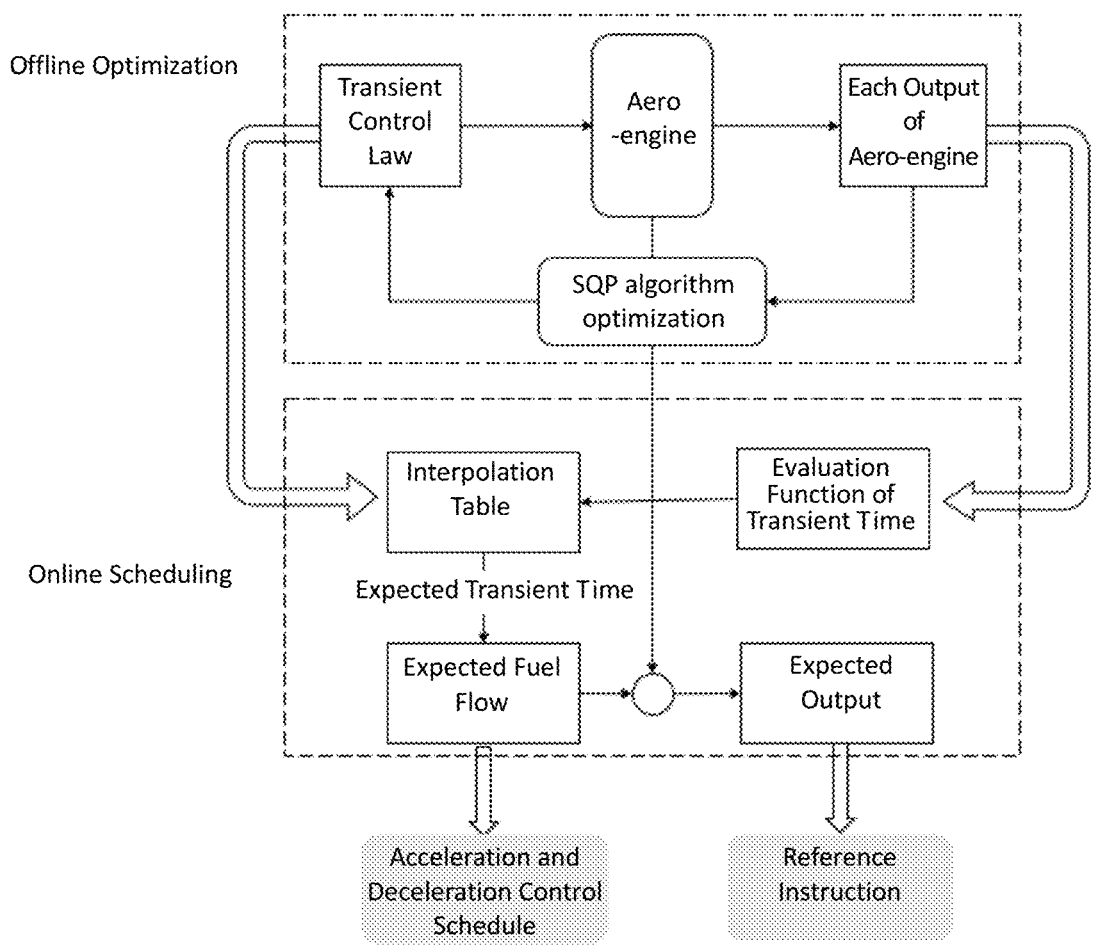
FIG. 1 is a structural diagram of a design method for optimization of a transient control law of an aero-engine.

The present invention will be further described below in combination with the drawings, and a structural diagram of a system is shown in FIG. 1.

Figure 2:
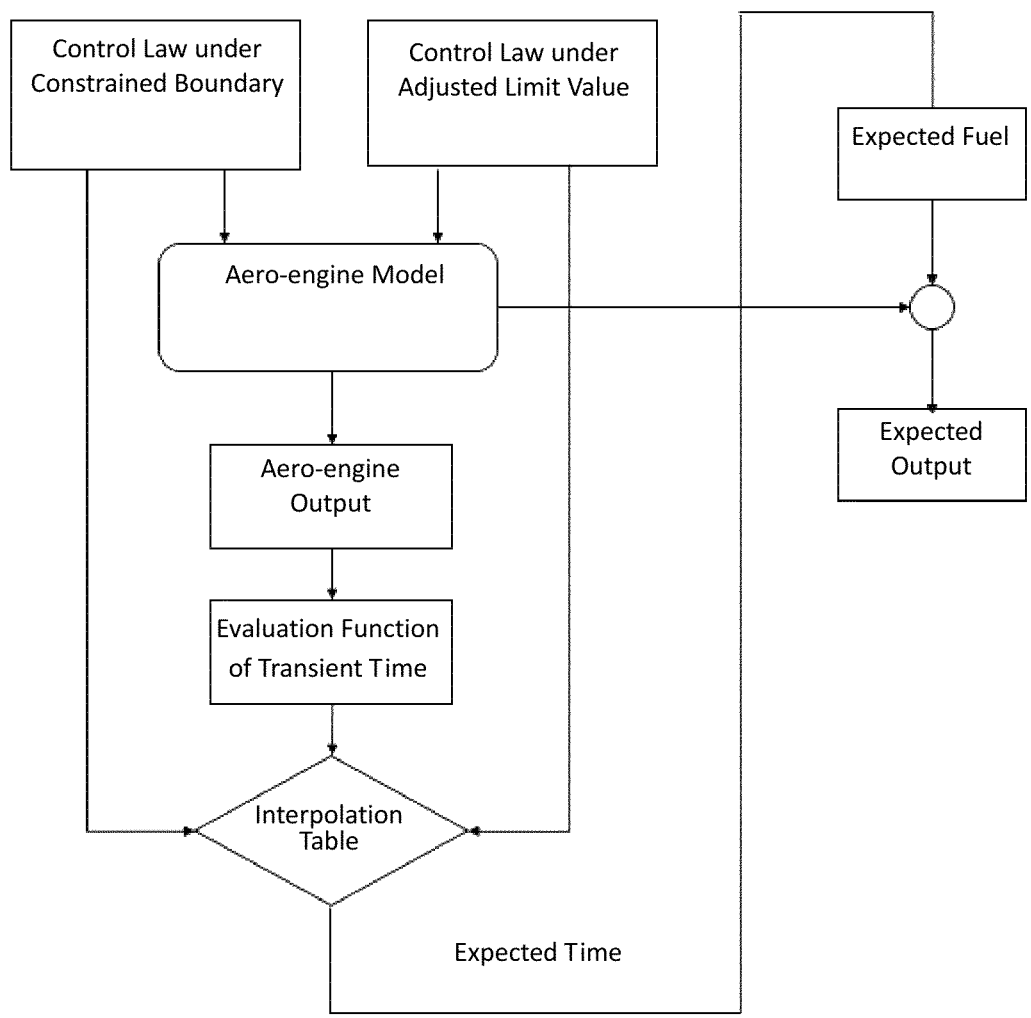
FIG. 2 is an overall flow chart of a design method for optimization of a transient control law of an aero-engine.
Figure 3:
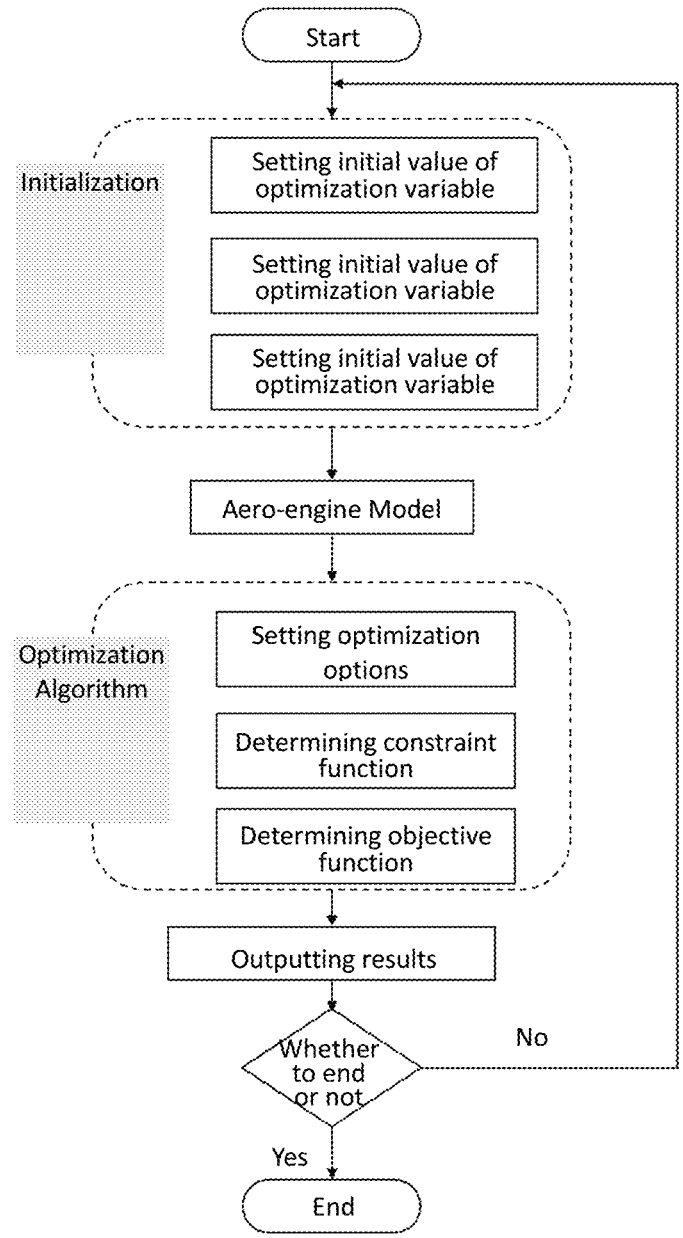
FIG. 3 is a flow chart of a design algorithm of a transient control law of an aero-engine running along a constrained boundary.
Figure 4:
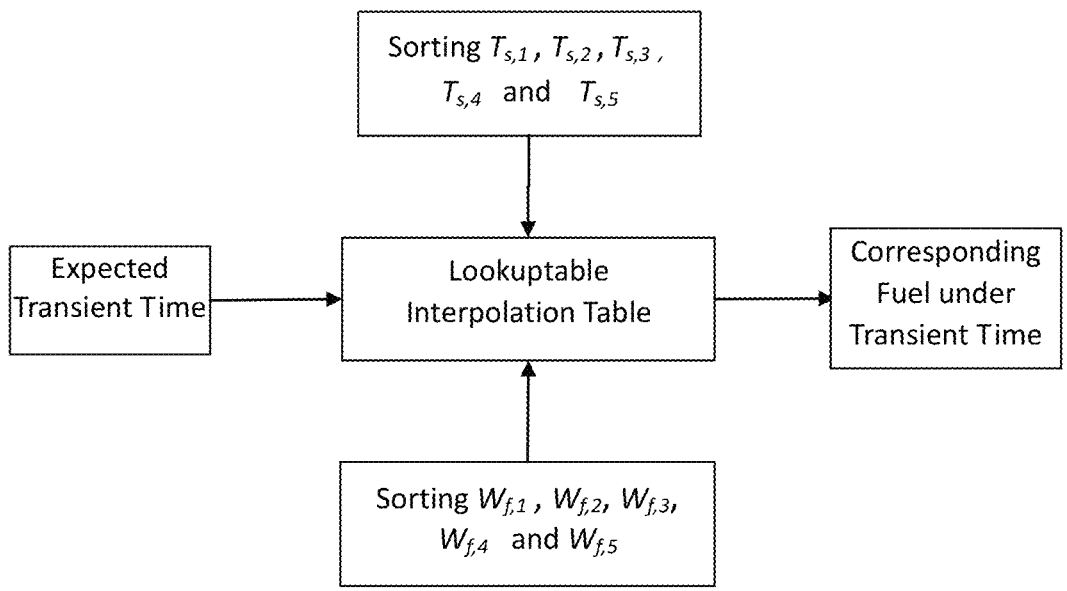
FIG. 4 is a flow chart of online transient-state control scheduling.
Figure 5:
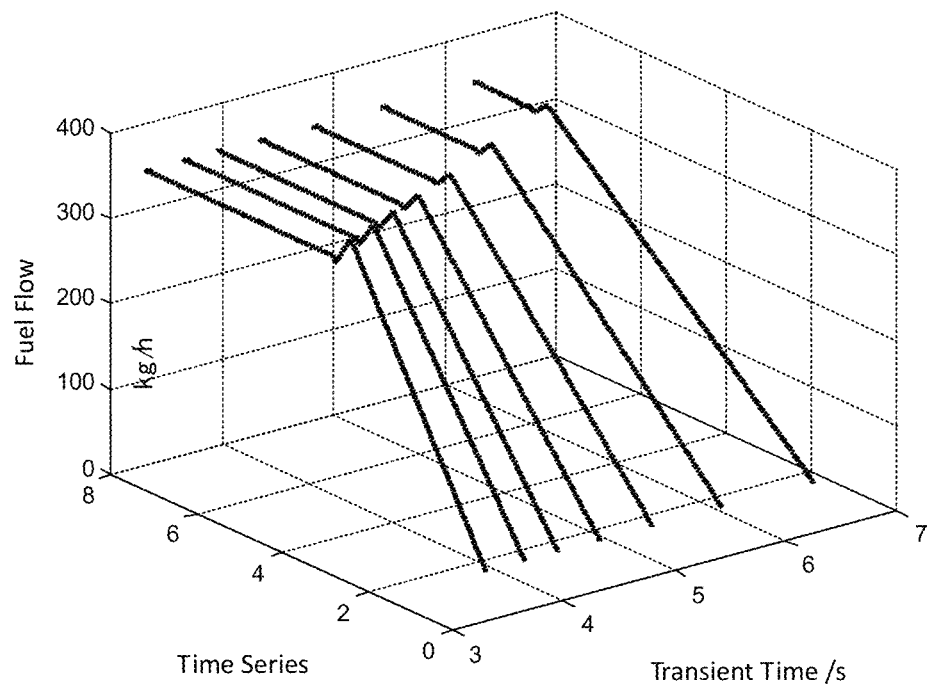
FIG. 5 is a three-dimensional curve of an interpolation table established based on the fuel flow obtained through optimization and the calculated transient time.
Figure 6:
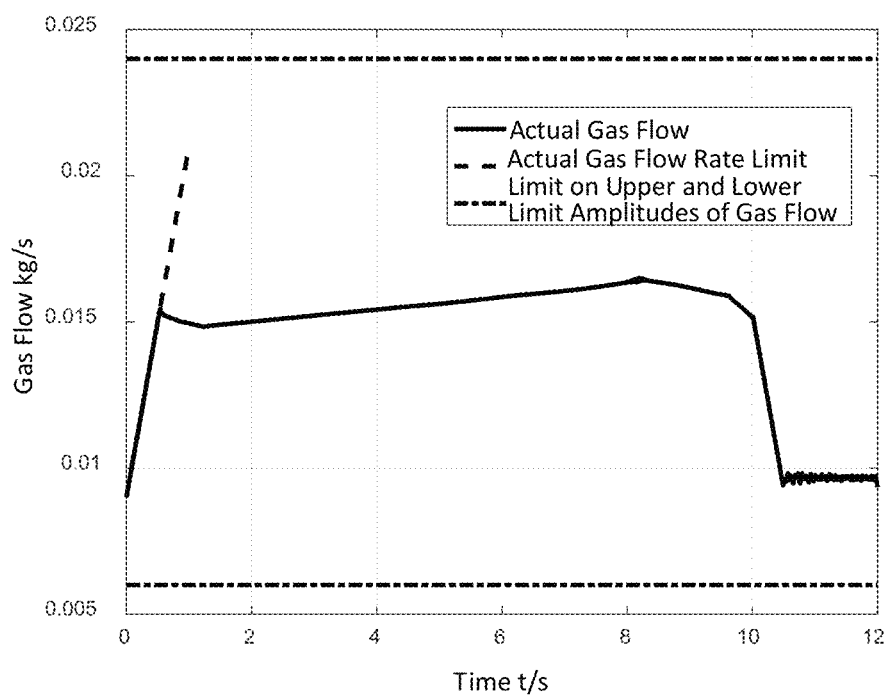
FIG. 6 is a transient control law diagram of a micro gas turbine obtained through optimization based on this method.

As shown in FIG. 2, a design method for optimization of a transient control law of an aero-engine comprises the following steps:

S1. performing the transient schedule optimization for the aero-engine by adopting an SQP algorithm, to realize the design of the transient control law of the aero-engine running along the constrained boundary;

S2. on the premise of not exceeding the limit boundary of the aero-engine, adjusting the limit value of the fuel flow rate of the aero-engine while other constraint conditions remain unchanged, thereby establishing the transient control law under different limits through optimization;

S3. after completing the design of the transient control law under different fuel rate limits, constructing the transient time evaluation function of the aero-engine, thereby determining the transient time under different transient control laws;

S4. sorting the fuel flow under different transient control laws and the corresponding transient time from smallest to biggest, and establishing a lookuptable interpolation table; and according to the established interpolation table, implementing online transient-state control scheduling, that is, inputting the expected transient time of aero-engine, and then obtaining the corresponding fuel flow under the transient time by scheduling;

S5. taking the fuel flow under the expected transient time as the aero-engine input to obtain the aero-engine output, and taking the relevant output parameters as the reference instruction of the closed-loop control of the aero-engine, to achieve the full closed-loop control of the aero-engine;

as shown in FIG. 3, the steps of the design for a transient control law of an aero-engine running along the constraint boundary are as follows:

S1. determining the optimized transient time to be T=8 seconds, and because the model thereof calculates the step length to be 0.025 seconds, determining the number of the optimal nodes to be 0:0.025:8, with a total of 321, by adopting a principle that the number of model calculation points is equal to the number of optimal nodes;

S2. taking the fuel flow of the aero-engine obtained under the action of a closed-loop controller as a reference, and taking the optimized initial value of the fuel flow as the numerical value of 59.1 Kg/h and a constant sequence with the length of 321, wherein after verification, under the action of the fuel, each output of the aero-engine does not exceed the limit value, which is a feasible solution;

S3. setting the parameters of the number of calculations of the maximum function MaxFunEvals, the maximum number of iterations MaxIter, the accuracy of function TolFun, etc., related to optimization options of an SQP method, and taking MaxFunEvals as INF, MaxIter as INF, and TolFun as 1 e-8;

S4 determining boundary conditions for the optimization of the transient control law of the aero-engine, mainly comprising high-pressure rotor speed $N_2$ limit, low-pressure rotor speed $N_1$ limit, compressor outlet total pressure $P_3$ limit, low-pressure turbine outlet temperature $T_5$ limit, surge margin of fan surge SMF, surge margin of compressor surge SMC, fuel flow $W_f$ limit, transient fuel flow rate $\Delta W_f$ limit, etc., and establishing corresponding constraint function according to the constraint condition, wherein the form thereof is shown as follows:

$N_{2,min} \leq N_2 \leq N_{2,max}$ $N_1 \leq N_{1,max}$ $P_3 \leq P_{3,max}$ $T_5 \leq T_{5,max}$ $SMF \geq SMF_{min}$ $SMC \geq SMC_{min}$ $W_{f,min} \leq W_f \leq W_{f,max}$ $\Delta W_f \leq \Delta W_{f,max}$ where, $N_{2,min}$ is minimum high-pressure rotor speed, $N_{2,max}$ is maximum high-pressure rotor speed, $N_{1,max}$ is minimum low-pressure rotor speed, $P_{3,max}$ is maximum value of compressor outlet total pressure, $T_{5,max}$ is maximum value of low-pressure turbine outlet temperature, $SMC_{min}$ is minimum value of compressor surge margin, $SMF_{min}$ is minimum value of fan surge margin, $W_{f,min}$ and $W_{f,max}$ are respectively minimum value and maximum value of fuel flow, and $\Delta W_{f,max}$ is maximum value of fuel flow rate, $N_{2,min}$ is taken as 68.9%, $N_{2,max}$ is taken as 102%, $N_{1,max}$ is taken as 102%, $P_{3,max}$ is taken as 1310 kPa, $T_{5,max}$ is taken as 873K, $W_{f,min}$ is taken as 39.6 kg/h, $W_{f,max}$ is taken as 465 kg/h, $\Delta W_{f,max}$ is taken as 2.5 kg/h/25 ms, $SMF_{min}$ is taken as 3%, $SMC_{min}$ is taken as 3%, and a constraint function is expressed as;

$68.9\% \leq N_2 \leq 102\%$ $N_1 \leq 102\%$ $P_3 \leq 1310$ $T_5 \leq 873$ $SMF \geq 3\%$ $SMC \geq 3\%$ $39.6 \leq W_f \leq 465$ $\Delta W_f \leq 2.5$ S5. according to the time requirement for the aero-engine transient state, establishing an objective function for optimization of the transient control law of the aero-engine, wherein the form thereof is shown as follows:

$J = 100 * norm(N_2 - N_{2,cmd}, 2) + 100 * norm(N_1 - N_{1,cmd}, 2)$ where, $N_{1,cmd}$ and $N_{2,cmd}$ are expected values of the low-pressure rotor speed and the high-pressure rotor speed, $N_{2,cmd}$ is taken as 100 and $N_{1,cmd}$ is taken as 100, and the objective function is expressed as;

$J=100*\text{norm}(N_2-100,2)+100*\text{norm}(N_1-100,2)$ the steps for establishing the transient control law under different limits are as follows:

S1. keeping the setting of optimal time and the number of optimal nodes, selection of initial value of the fuel flow and the setting of each optimization option consistent with the transient schedule optimization along the constrained boundary;

S2. keeping the high-pressure rotor speed $N_2$ limit, the low-pressure rotor speed $N_1$ limit, the compressor outlet total pressure $P_3$ limit, the low-pressure turbine outlet temperature $T_5$ limit, the surge margin of the fan surge SMF, the surge margin of the compressor surge SMC and the fuel flow $W_f$ in the aero-engine transient state limit unchanged, on the premise of not exceeding the maximum limit value $\Delta W_{f,max}=2.5$ of the transient fuel flow rate, changing the fuel flow rate limit, respectively set as $\Delta W_{f,1}=2.2$, $\Delta W_{f,2}=2.0, \Delta W_{f,3}=1.8$, $\Delta W_{f,3}=1.6, \Delta W_{f,3}=1.4$ and $\Delta W_{f,3}=1.2$, and performing the transient schedule optimization under different fuel flow rate limits again, to obtain the control law under different conditions, that is, fuel flow of $W_{f,1}$, $W_{f,2}$, $W_{f,3}$, $W_{f,4}$ and $W_{f,5}$;

S3. saving the fuel flow of $W_{f,1}$, $W_{f,2}$, $W_{f,3}$, $W_{f,4}$ and $W_{f,5}$ of the aero-engine obtained through optimization under different fuel flow rate limits;

the steps for constructing transient time evaluation function of the aero-engine are as follows:

S1 producing aero-engine model outputs: loading the optimized fuel flow $W_f$ of the aero-engine into the aero-engine model, to obtain the aero-engine outputs: low-pressure rotor speed $N_1$, low-pressure rotor conversion speed $N_{1cor}$, high-pressure rotor speed $N_2$, high-pressure rotor conversion speed of imported aero-engine $N_{2cor}$, etc.;

S2 taking high-pressure rotor speed $N_2$ in the aero-engine output as the evaluation variable of the aero-engine transient time, and when the speed fluctuates 0.2% above and below the steady state value, entering a steady state by default, wherein the entered time is the aero-engine transient time;

S3 loading the fuel flow $W_{f,1}$, $W_{f,2}$, $W_{f,3}$, $W_{f,4}$, and $W_{f,5}$ in the transient control law of the aero-engine under different limits into the aero-engine model, to obtain the aero-engine model outputs of $N_{2,1}$, $N_{2,2}$, $N_{2,3}$, $N_{2,4}$, and $N_{2,5}$ under different limits, and calculating the transient time of $T_{s,1}$, $T_{s,2}$, $T_{s,3}$, $T_{s,4}$ and $T_{s,5}$ under different limits and saving;

as shown in FIG. 4, the steps for implementing the online transient-state control scheduling are as follows:

S1. sorting the fuel flow under limits and the corresponding transient time $T_{s,1}$, $T_{s,2}$, $T_{s,3}$ ... $T_{s,N}$ from smallest to biggest;

S2. taking each transient time of $T_{s,1}$, $T_{s,2}$, $T_{s,3}$ ... $T_{s,N}$ as an interpolation node 1, taking the corresponding fuel flow of $W_{f,1}$, $W_{f,2}$, $W_{f,3}$ ... $W_{f,N}$ as Tabledata, since the fuel flow loaded into the model is in a time series format, taking the time series of the fuel flow as the interpolation node 2, and establishing the lookuptable interpolation table, as shown in FIG. 5, taking the transient time as the amount of scheduling, and scheduling the corresponding fuel flow according to the expected transition time;

S3. selecting the expected transient time $T^*_s$, and interpolating through the established interpolation table, to obtain a group of fuel flow $W^*_f$ corresponding to the transient time, thereby implementing the online transient time scheduling;

S4. taking the fuel flow $W^*_f$ under the expected transient time as the aero-engine input, and saving the relevant aero-engine output, to take the saved output as reference instruction of the closed-loop controller;

FIG. 5 is a three-dimensional curve of an interpolation table established based on fuel flow obtained through optimization and the calculated transient time;

FIG. 6 is a transient control law diagram of a micro gas turbine obtained through optimization based on this method;

In summary, it can be seen that an optimization method for the transient control law of the aero-engine proposed in the present invention is effective and feasible, and has universal applicability, which can be applied to the optimization of the transient control law of other types of aero-engines.

The invention claimed is:

1. A design method for optimization of a transient control law of an aero-engine, wherein the steps are as follows:

S1 performing the transient schedule optimization for the aero-engine based on an SQP algorithm, to realize the design of the transient control law of the aero-engine running along the constrained boundary;

the steps for the design of the transient control law of the aero-engine running along the constrained boundary are as follows:

S1.1 determining the number of optimal nodes and the length of the entire optimization process time;

S1.2 taking the fuel flow obtained by the aero-engine under the action of a closed-loop controller as a reference, and selecting the initial value of the fuel flow, so that each output of the aero-engine does not exceed the limit value after the finally determined initial value of the fuel flow is loaded into an aero-engine model;

S1.3 setting the parameters of the number of calculations of the maximum function MaxFunEvals, the maximum number of iterations MaxIter and the accuracy of function TolFun related to optimization options of an SQP algorithm;

S1.4 determining boundary conditions for the optimization of the transient control law of the aero-engine, comprising high-pressure rotor speed $N_2$ limit, low-pressure rotor speed $N_1$ limit, compressor outlet total pressure $P_3$ limit, low-pressure turbine outlet temperature $T_5$ limit, surge margin of fan surge SMF, surge margin of compressor surge SMC, fuel flow $W_f$ limit and transient fuel flow rate $\Delta W_f$ limit, and establishing corresponding constraint function according to the constraint condition, wherein the form thereof is shown as follows:

$N_{2,min} \leq N_2 \leq N_{2,max}$ $N_1 \leq N_{1,max}$ $P_3 \leq P_{3,max}$ $T_5 \leq T_{5,max}$ $SMF \geq SMF_{min}$ $SMC \geq SMC_{min}$ $W_{f,min} \leq W_f \leq W_{f,max}$ $\Delta W_f \leq \Delta W_{f,max}$ where, $N_{2,min}$ is minimum high-pressure rotor speed, $N_{2,max}$ is maximum high-pressure rotor speed, $N_{1,max}$ is minimum low-pressure rotor speed, $P_{3,max}$ is maximum value of compressor outlet total pressure, $T_{5,max}$ is maximum value of low-pressure turbine outlet temperature, $SMC_{min}$ is minimum value of compressor surge margin, $SMF_{min}$ is minimum value of fan surge margin, $W_{f,min}$ and $W_{f,max}$ are respectively minimum value and maximum value, and $\Delta W_{f,max}$ is maximum value of fuel flow rate;

S1.5 according to the time requirement for the transient state of the aero-engine, establishing the objective function for optimization of the transient control law of the aero-engine, wherein the form thereof is shown as follows:

$$J=100*\text{norm}(N_2-N_{2,cmd}, 2)+100*\text{norm}(N_1-N_{1,cmd}, 2)$$

where, $N_{1,cmd}$ and $N_{2,cmd}$ are expected values of the low-pressure rotor speed and the high-pressure rotor speed;

S2. on the premise of not exceeding the limit boundary of the aero-engine, adjusting the limit value of the fuel flow rate of the aero-engine while other constraint conditions remain unchanged, thereby establishing the transient control law of the aero-engine under different fuel rate limits;

the steps for the design of the established transient control law of the aero-engine under different fuel rate limits are as follows:

S2.1 keeping the number of optimal nodes, the whole optimization process time, the initial value of the fuel flow and the setting of each optimization option consistent with the transient schedule optimization along the constrained boundary;

S2.2 keeping the high-pressure rotor speed $N_2$ limit, the low-pressure rotor speed $N_1$ limit, the compressor outlet total pressure $P_3$ limit, the low-pressure turbine outlet temperature $T_5$ limit, the surge margin of the fan surge SMF, the surge margin of the compressor surge SMC and the fuel flow $W_f$ limit in the transient state of the aero-engine unchanged, on the premise of not exceeding the maximum limit value $\Delta W_{f,max}$ of the transient fuel flow rate, changing the fuel flow rate limit, respectively set as $\Delta W_{f,1}, \Delta W_{f,2}, \Delta W_{f,3} \ldots \Delta W_{f,N}$, and performing the transient schedule optimization under different fuel flow rate limits again, to obtain the control law under different conditions, that is, fuel flow of $W_{f,1}, W_{f,2}, W_{f,3}, \ldots W_{f,N}$;

S2.3 saving the fuel flow of $W_{f,1}, W_{f,2}, W_{f,3} \ldots W_{f,N}$ of the aero-engine obtained through optimization under different fuel flow rate limits, to prepare for later fuel flow scheduling;

S3. after completing the design of the transient control law under different fuel rate limits, constructing the transient time evaluation function of the aero-engine, thereby determining the transient time under different transient control laws;

the steps for constructing transient time evaluation function of the aero-engine are as follows:

S3.1 producing aero-engine model outputs: loading the fuel flow $W_f$ of the aero-engine into the aero-engine model, to obtain the aero-engine outputs: low-pressure rotor speed $N_1$, low-pressure rotor conversion speed $N_{1cor}$, high-pressure rotor speed $N_2$ and high-pressure rotor conversion speed of imported aero-engine $N_{2cor}$;

S3.2 taking high-pressure rotor speed $N_2$ in the aero-engine output as the evaluation variable of the transient time of the aero-engine, and when the speed fluctuates 0.2% above and below the steady state value, entering a steady state by default, wherein the entered time is the transient time of the aero-engine;

S3.3 loading the fuel flow of $W_{f,1}, W_{f,2}, W_{f,3} \ldots W_{f,N}$ in the transient control law of the aero-engine under different limits into the aero-engine model, to obtain the aero-engine model outputs of $N_{2,1}, N_{2,2}, N_{2,3} \ldots N_{2,N}$ under different limits, and calculating the transient time of $T_{s,1}, T_{s,2}, T_{s,3} \ldots T_{s,N}$ under different limits and saving;

S4. sorting the fuel flow under different transient control laws and the corresponding transient time from smallest to biggest, and establishing a lookuptable interpolation table; and according to the established interpolation table, implementing online transient-state control scheduling, that is, inputting the expected transient time of aero-engine, and then obtaining the corresponding fuel flow under the transient time by scheduling;

the steps for implementing the online transient-state control scheduling are as follows:

S4.1 sorting the fuel flow under limits and the corresponding transient time of $T_{s,1}, T_{s,2}, T_{s,3} \ldots T_{s,N}$ from smallest to biggest;

S4.2 taking each transient time of $T_{s,1}, T_{,2}, T_{s,3} \ldots T_{s,N}$ as an interpolation node 1, taking the corresponding fuel flow of $W_{f,1}, W_{f,2}, W_{f,3} \ldots W_{f,N}$ as Tabledata, since the fuel flow rate loaded into the aero-engine model is in time series format, taking the time series of the fuel flow as the interpolation node 2, and establishing the lookuptable interpolation table;

S4.3 selecting the expected transient time $T^*_s$, and interpolating through the established interpolation table, to obtain a group of fuel flow $W^*_f$ corresponding to the transient time, thereby implementing the online transient time scheduling;

S4.4 taking the fuel flow $W^*_f$ under the expected transient time as the aero-engine input, and saving the relevant aero-engine output, to take the saved output as reference instruction of the closed-loop controller;

S5. taking the fuel flow under the expected transient time as the aero-engine input to obtain the aero-engine output, and taking the relevant output parameters as the reference instruction of the closed-loop control of the aero-engine, to achieve the full closed-loop control of the aero-engine.

* * * * *